Jan. 30, 1968  H. L. ROUSEY  3,366,511
SEAL FOR BATTERY COVER
Filed May 10, 1965
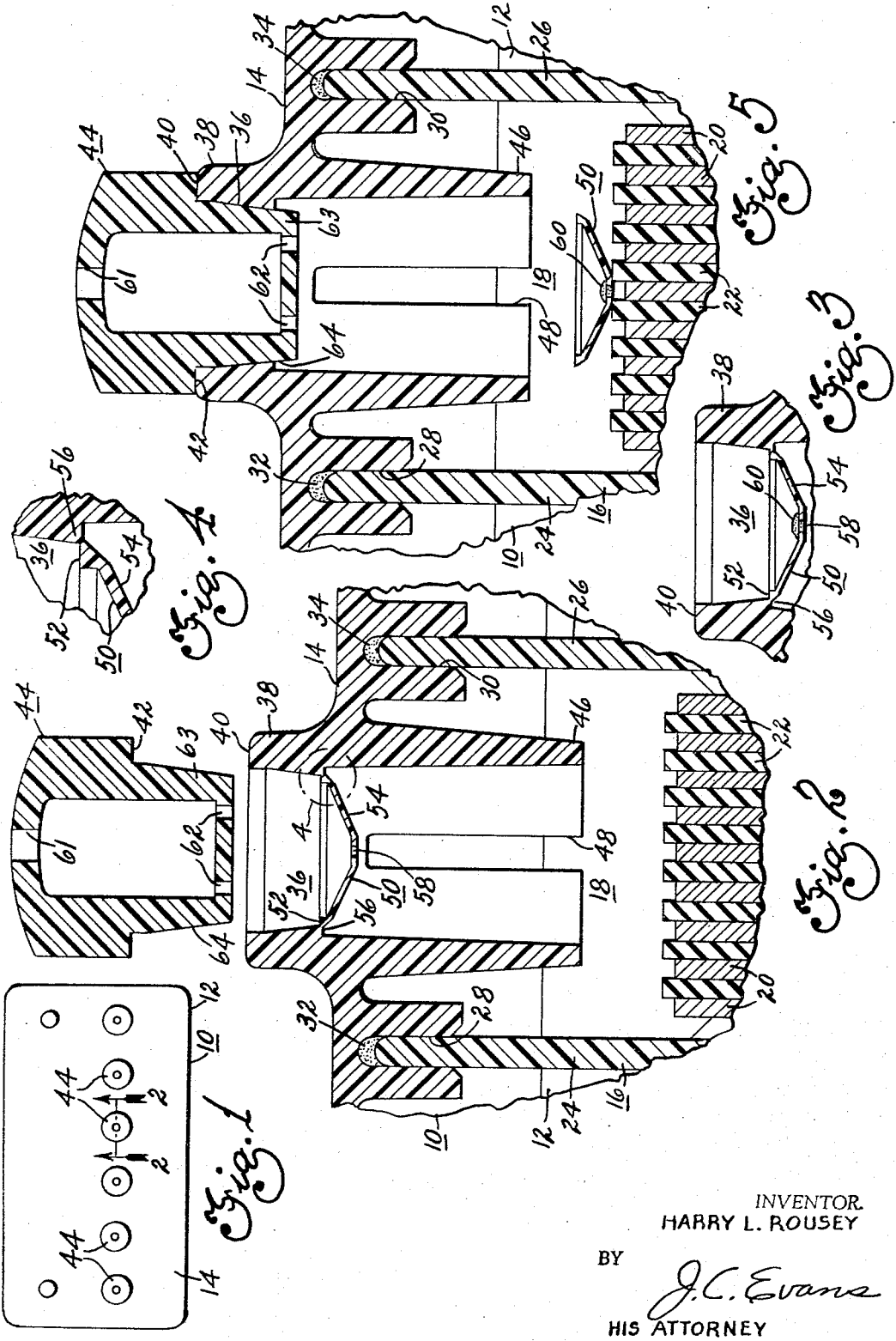
INVENTOR.
HARRY L. ROUSEY
BY
*J.C. Evans*
HIS ATTORNEY

United States Patent Office 3,366,511
Patented Jan. 30, 1968

3,366,511
SEAL FOR BATTERY COVER
Harry L. Rousey, Anderson, Ind., assignor to General Motors Corporation, Detroit, Mich., a corporation of Delaware
Filed May 10, 1965, Ser. No. 454,537
3 Claims. (Cl. 136—170)

ABSTRACT OF THE DISCLOSURE

A means for sealing a dry-charge battery for storage, wherein the sealing means is a generally conically shaped, apertured diaphragm having a thickened peripheral portion which is attached to the lower edge of an electrolyte fill passage by means of a specific thin-sectioned web. The structure is such as to insure that upon the punching-out of the diaphragm the lower edge of the fill passage will break away.

---

This invention relates to dry-charge batteries and in particular to a cover construction and method of use therefor to seal dry-charge batteries during shipment and storage.

One problem with dry-charge batteries is how to seal them against humidity, moisture and the like during storage and shipment to avoid deterioration of the cell plates that can reduce the battery capacity upon activation. Desirably, the seal construction must be easily assembled in the battery during its construction; the seal construction should be durable during shipment and storage of the battery and it should not hinder the filling operation required to activate the battery.

Accordingly, an object of this invention is to improve the sealing of dry-cell charge batteries by the provision of a battery cover having fill openings therein with integral barriers thereacross used to seal interior cells of the battery construction under a partial vacuum and arranged to be ruptured by insertion of a fill cap into the fill openings to clear the fill openings for a subsequent passage of electrolytic and liquid therethrough into the cells for activating the battery.

A further object of the invention is to improve sealing of dry-charge type batteries during their shipment and storage by an improved method of sealing including the use of a battery cover of a moldable acid resistance, plastic material having fill openings therein with an integrally formed web thereacross forming a moisture barrier that maintains the dry-charge battery under a partial vacuum and wherein, merely by inserting an associated fill cap into the fill opening following shipment and storage, the web is removed from the fill opening to allow for a subsequent passage therethrough of electrolyte and liquid into the cells of the battery.

Still another object of the present invention is to improve dry-charge batteries by the provision of a cover construction including fill openings therethrough and wherein the cover includes an integrally formed thin web directed across the fill openings for producing a barrier against the entrance of humid atmosphere exteriorly of the battery into its interior cells during shipment and storage and wherein the thin web includes a portion thereon readily detachable from the remainder of the cover upon insertion of a fill cap into the fill opening whereby the dry-charge battery following shipment and storage is readily conditionable for filling through the openings with an electrolyte and a liquid for activating the dry-charge battery cells.

A still further object of the invention is to improve dry-charge type batteries by the provision of a battery cover having a fill opening therein with a thin web directed thereacross formed integrally with the cover that includes a restricted orifice opening therein through which gases interiorly of the battery are exhausted therefrom during its manufacture and wherein said restricted orifice is covered by a drop of impervious material so that the thin web serves to produce a barrier in the cover for maintaining the interior of the battery under a partial vacuum and wherein said thin web has a portion thereon readily detachable from the remainder of the cover by insertion of a fill plug therein whereby the fill opening is cleared for a subsequent passage of liquid and electrolyte through the fill opening into the interior of the dry-charge for activating the cell components therein.

Yet another object of this invention is to improve dry-charge batteries by the provision of a cover construction including fill openings therein having the cross-sectional flow area thereof blocked by a thin web integrally formed on the cover serving as a barrier against the ingress of humid atmosphere interiorly of the battery during its shipment and storage and wherein the battery cover includes a portion thereon adapted to be sealed against the outer case of a cell in the battery to produce a partial vacuum in the battery during shipment and storage thereof, the thin web member also including a portion readily detachable from the remainder of the cover upon insertion of a fill cap into the fill opening whereby the cross-sectional flow area through the opening is cleared for subsequent passage therethrough of an electrolyte and liquid into the interior of the battery for activating cell components therein.

Further objects and advantages of the present invention will be apparent from the following description, reference being had to the accompanying drawings wherein a preferred embodiment of the present invention is clearly shown.

In the drawings:

FIGURE 1 is a top plan view of a dry-charge storage battery equipped with a cover and fill opening construction constructed in accordance with the present invention;

FIGURE 2 is an enlarged, fragmentary cross-sectional view taken along the line 2—2 of FIGURE 1 showing the cover prior to when the battery is stored and shipped along with an associated fill cap;

FIGURE 3 is a fragmentary, sectional view of the fill opening construction of the cover following sealing of the battery;

FIGURE 4 is an enlarged, fragmentary view of region 4 in FIGURE 2; and

FIGURE 5 is a view like FIGURE 2 showing the improved cover following activation of the battery and the insertion of a vented fill cap in the fill opening.

Dry-charge batteries are manufactured and shipped for storage in a dry condition requiring sealing of the interior cell space therein against humid atmosphere and other foreign matter such as dust. Such foreign matter can seriously affect the characteristics of the cell components by chemical deterioration thereof in a manner that the battery, upon activation, will be materially reduced in efficiency and life.

A dry-charge battery 10 is shown in FIGURE 1 including a plurality of cells which are electrically connected and contained in a surrounding outer casing 12 of acid resistant plastic material having a top opening thereto closed by a one-piece battery cover 14 of a moldable acid resistant plastic material that forms in cooperation with the outer casing 12 a sealed dry-charge unit suitable for shipping and storage.

In FIGURE 2, one of the battery cells 16 is shown as having an interior space 18 therein in which is located a plurality of battery grid plates 20 separated by suitable insulating separator plates 22. The space 18 is enclosed on its sides by cell divider walls 24, 26 directed transversely across the battery between the inside surface of the outer casing 12 to separate space 18 from like spaces on either side thereof. The one-piece cover 14 fits over the upper edge of the outer casing 12 and the walls 24, 26 and, as shown in FIGURE 2, includes a transverse groove 28 therein for receiving the upper edge of the wall 24 and a like spaced transverse groove 30 therein receiving the upper edge of the wall 26. A suitable layer 32 of sealing compound is located in the groove 28 between the upper edge of the wall 24 and the cover 14. A like layer 34 of sealing compound is located in the groove 30 between the cover and wall 26 to seal across the top edge of the wall 26.

Like grooves are formed around the edges of the cover 14 to receive the upper edges of the outer casing 12 and like sealing compound is disposed therebetween for sealing the peripheral edges of the battery 10. The one-piece cover groove details described above are more specifically set forth in United States Patent No. 2,942,055, issued June 21, 1960.

In accordance with certain principles of the present invention, the cover 14 at each cell includes a fill opening 36 formed by a tubular extension 38 formed integrally on the cover 14 directed upwardly therefrom to define an annular upper surface 40 for supportingly receiving a shoulder 42 of a vented fill cap member 44. The opening 36 is defined by a continuous wall and takes the shape of an inverted truncated cone. The lower wall at the bottom of the extension 38 lies in the plane of truncation of the cone. Were the continuous wall and lower wall conceptually extended so as to intersect, the line of intersection would be within the thickened rim section beneath the surface 52. The virtual angle formed by these intersecting walls is effectively the lower annular edge of the opening 36. A depending annular skirt 46 formed integrally on the cover 14 is located within the interior 18 of the cell as shown in FIGURES 2 and 5. The annular skirt 46 has a groove 48 formed therein for the passage of gases from an activated battery unit through the vented cap member 44 exteriorly of the battery 10.

In the present invention, the cover 14 has a thin web member 50 formed integrally thereon directed across the fill opening 36 between the tubular extension 38 and the depending skirt 46 to effect a barrier between the interior space 18 of a cell and the exterior of the battery 10. In the illustrated embodiment of the invention the thin web member 50 has an annular flat peripheral surface 52 formed thereon around its outside edge and a conically-shaped inner surface 54 that cooperate to form a thin-sectioned annular region 56 between the tubular extension 38 and the thin web member 50. A contact line is formed at the intersection between the surface 52 and the wall defining the opening 36. Another, or second, contact line is formed at the intersection of the conical surface 54 with the lower wall. A thin-sectioned annular region 56 lies between these contact lines. The region 56 then is the minimum contact area between the rim and the wall. As such, it is the weakest region and hence becomes the break-away area when the web is punched-out. This rim-wall contact area lies in planes which subtend the aforesaid virtual angle. To visualize the locus of the break-away area, consider a number of extended planes all passing through the first contact line and intersecting the included angle formed between the continuous wall and the surface 52. The web member 50 is formed during the molding of the cover 14 and in one working embodiment has a thickness of .04 inch. Above the web member 50 the inside diameter of the extension 38 is smaller than the inside diameter of skirt 46 below web member 50. By virtue of this structure the web member 50 is unsupported beneath the annular region 56 whereby a downwardly directed force on the region 56 will cause the web member 50 to be readily detached from the cover 14 for purposes to be discussed.

During the manufacture of dry-charge batteries, the cell plates and separators 20, 22 are located in the cell interiors 18. After forming the plates, washing and drying operations carried out thereon may result in a battery temperature in the order of 125° F. Then the cover 14 is placed on the outer casing and cell divider walls. When the cover 14 is assembled a restricted vent opening 58 in the web member 50 is open to allow for proper placement of the cover 14 on the casing 12. Following the final location of the cover 14 on the outer casing 12, the vent opening 58 is covered by a drop of impervious material 60 to completely seal the cover 14 as shown in FIGURE 3. As the battery cools, following the location of the cover on the outer casing 12 in sealing engagement therewith and the location of the drop of impervious material across the vent opening 58 in each of the thin web members 50, cooling of the remaining atmosphere in the cell interiors 18 will produce a predetermined partial vacuum therein. By virtue of the seal between the cover 14 and the casing 12 and the provision of the thin web member 50 and drop of material 60, the interior of the cells 18 will be completely and very effectively sealed against the ingress of humid, outside atmosphere, dirt or the like that might undesirably affect the cell components during shipment and storage. The resulting partial vacuum in the interior space 18 reduces the amount of oxidation of plates during battery storage. If desired, prior to blocking the vent openings 58, the interior spaces 18 can be purged with a suitable inert gas to further reduce plate oxidation during sealed shipment and storage.

By virtue of the above-described structure, when it is desired to activate the illustrated dry-charge battery, a vented cap is inserted into the fill opening to rupture the thin web member 50. The illustrated push-type vented cap 44, which is merely representative of one suitable cap for use with the cover 14, has a top vent opening 61 therein and offset bottom vent openings 62 formed in an end extension 63 thereon, representatively shown in the illustrated embodiment as having a smooth, conically-shaped outer surface 64.

The caps 44 are shipped loose with the sealed dry-charge battery. When it is desired to activate the battery a cap 44 is inserted into one of the openings 36 until the end extension 63 engages the surface 52 of the thin web 50. Further insertion of the fill cap 44 into the fill opening 36 causes the web 50 to become detached from the inner surface of the tubular extension 38 at the thin-sectioned annular region 56 whereby the web 50 is able to be pushed downwardly through the large diameter interior of the skirt 46 into the interior 18 of the cell to be removed from the fill opening 36, so as to clear the opening 36 for the free passage of electrolyte and liquid into the cells for activating the components 20 therein.

By virtue of the construction of the cover 14, it is conditionable for battery activation without the need for special tools. Moreover, the cover 14, insofar as the seal is concerned, only entails the addition of a thin web thereon economically and quickly formable integrally thereon during the molding thereof.

In FIGURE 5 of the drawings, the detached web 50 is shown cleared from the fill opening 36 and the interior space 18 of the battery as having been filled with a predetermined amount of electrolyte and liquid to activate the components therein.

The above-described construction of the web member 50 in combination with the drop of impervious material 60 and their effective sealing characteristics against surrounding humid atmosphere assures that the cell components 20 upon activation will have a full charge capacity. Furthermore, the inventive cover eliminates the need for the inclusion of specially constructed vent cap arrangements that unduly increase the cost of sealing. One example of such a modified vent cap construction is described in United States Patent No. 2,872,499, issued Feb. 3, 1959. Moreover, the cover construction of the present invention locates the seal interiorly of the battery so as to eliminate possible seal damage during shipping and storage.

While the embodiment of the present invention as herein disclosed constitutes a preferred form, it is to be understood that other forms might be adopted.

What is claimed is as follows:

1. A sealed dry-charge battery assembly comprising a case, a cover for said case having at least one electrolyte fill opening therein including a first continuous wall defining a truncated conically shaped electrolyte flow passage and a second wall which lies in the plane of truncation of said passage, which second wall forms an angle of virtual intersection with said first wall, an apertured, removable, sealing diaphragm having a generally conical upper surface sloping toward said aperture, said diaphragm being integral with said cover and pendant from the region about said angle, an impervious sealing compound sealing said aperture, said pendant diaphragm having a thickened rim section, said thickened rim section having a substantially flat upper surface and a substantially conical lower surface, said substantially flat upper surface contacting said first wall adjacent said angle along a first contact line, said substantially conical lower surface contacting said second wall adjacent said angle along a second contact line which is spaced outwardly from said first contact line, a rim-wall contact area between said contact lines which area subtends said angle and substantially defines the break-away area between said thickened rim and said wall to insure that upon the punching-out of said diaphragm no residual rough edge is left projecting into said passage especially along said first contact line, and a cap for said fill opening having a tubular extension registering with said flat upper surface of said thickened rim section and in close fitting relation to said first wall at said first contact line to insure the clean break-away of said diaphragm from said wall at said first contact line and to mate with said wall substantially along said first contact line after said diaphragm is punched-out and said cap is fully inserted into said fill opening.

2. In a cover for a dry-charge battery assembly wherein said cover has at least one electrolyte fill opening therein including a first continuous wall defining a truncated conically shaped electrolyte flow passage, a second wall which lies in the plane of truncation of said passage and an apertured, removable, sealing diaphragm integral with said cover and extending completely across said passage, the improvement comprising said diaphragm being pendant from the region about the angle formed by the virtual intersection of said first wall and said second wall and having a generally conical upper surface sloping toward said aperture, said pendant diaphragm having a thickened rim section, said thickened rim section having a substantially flat upper surface and a substantially conical lower surface, said substantially flat upper surface contacting said first wall adjacent said angle along a first contact line, said substantially conical lower surface contacting said second wall adjacent said angle along a second contact line which is spaced outwardly from said first contact line, a rim-wall contact area between said contact lines which area subtends said angle and substantially defines the break-away area between said thickened rim and said wall to insure that upon the punching-out of said diaphragm no residual rough edge is left projecting into said passage especially along said first contact line.

3. In a cover for a dry-charge battery assembly wherein said cover has at least one electrolyte fill opening therein including a first continuous wall defining a truncated conically shaped electrolyte flow passage, a second wall which lies in the plane of truncation of said passage and an apertured, removable, sealing diaphragm integral with said cover and extending completely across said passage, the improvement comprising said diaphragm being pendant from the lower edge of said first wall and having a generally conical upper surface sloping toward said aperture, said pendant diaphragm having a thickened rim section, said thickened rim section having a substantially flat upper surface and a substantially conical lower surface, said substantially flat upper surface contacting said first wall along a first contact line, said substantially conical lower surface contacting said second wall along a second contact line which is spaced outwardly from said first contact line, a rim-wall contact area between said contact lines which area substantially defines the break-away area between said thickened rim and said wall and which area lies in planes which intersect the angle formed by said first wall and said flat surface at said first contact line.

References Cited

UNITED STATES PATENTS

| 1,737,718 | 12/1929 | Housmann. | |
| 2,713,080 | 7/1955 | Barrett | 136—162 |
| 2,051,987 | 8/1936 | Domizi | 136—90.1 |
| 2,310,656 | 2/1943 | Shank | 136—177.6 |

FOREIGN PATENTS

| 444,931 | 2/1949 | Italy. |
| 899,213 | 12/1953 | Germany. |

ALLEN B. CURTIS, *Primary Examiner.*

WINSTON A. DOUGLAS, *Examiner.*

D. L. WALTON, *Assistant Examiner.*